Patented Apr. 7, 1953

2,634,267

UNITED STATES PATENT OFFICE 2,634,267

PENICILLIN SALT OF DIMETHYLAMINO-ACETOXY-DIBENZYLPROPANE

Harley W. Rhodehamel, Jr., Indianapolis, Ind., assignor to Eli Lilly and Company, Indianapolis, Ind., a corporation of Indiana No Drawing. Application February 13, 1952, Serial No. 271,434

2 Claims. (Cl. 260—239.1)

This invention relates to a novel penicillin salt and the preparation thereof.

I have discovered that 1-dimethylamino-3-acetoxy-3,3-dibenzylpropane or its salts can be combined with penicillin or its salts by neutralization or metathetical reactions to form a sparingly soluble penicillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The following examples illustrate the preparation of the novel salt of this invention:

Example 1

To a solution of 2 g. of penicillin (e. g. a commercial mixture of the several penicillins) dissolved in 25 ml. of amyl acetate are added 2 g. of 1 - dimethylamino - 3 - acetoxy - 3,3 - dibenzylpropane dissolved in 50 ml. of amyl acetate. The mixture is cooled and stirred occasionally whereupon the 1 - dimethylamino - 3 - acetoxy - 3,3-dibenzylpropane salt of penicillin precipitates. The salt is isolated as by decantation or filtration, and dried in vacuo.

The salt is represented by the following formula in which P represents penicillin:

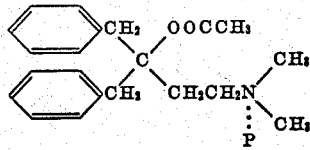

Example 2

To an aqueous solution of 0.3 g. of the potassium salt of penicillin G in 1.8 ml. of water is added a solution of 0.3 g. of 1 - dimethylamino - 3 - acetoxy-3,3-dibenzylpropane hydrochloride in 5 ml. of water. The mixture is cooled and stirred occasionally whereupon the slightly soluble 1 - dimethylamino - 3 - acetoxy - 3,3 - dibenzylpropane salt of penicillin G precipitates. The salt is separated, and dried in vacuo.

The preparation of 1 - dimethylamino - 3 - acetoxy - 3,3 - dibenzylpropane can be accomplished as follows: 2 molecular equivalents of a Grignard reagent prepared from benzyl chloride are coupled with 1 molecular equivalent of ethyl γ-aminopropionate, and decomposed with aqueous acid to form 1-dimethylamino-3-hydroxy-3,3-dibenzylpropane. Acetylation of 1-dimethylamino-3-hydroxy-3,3-dibenzylpropane using acetic anhydride in the usual manner yields 1-dimethylamino-3-acetoxy-3,3-dibenzylpropane. The acid addition salts of 1 - dimethylamino - 3 - acetoxy-3,3-dibenzylpropane base are obtained by the usual methods, e. g. interreaction of equivalent amounts of the base and a selected acid in inert solvent solution, followed by removal of the solvent.

I claim:

1. The 1 - dimethylamino - 3 - acetoxy - 3,3-dibenzylpropane salt of penicillin represented by the following formula in which P represents penicillin:

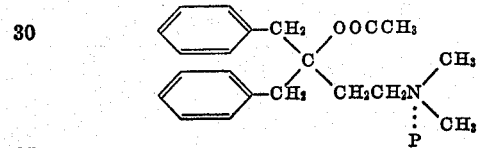

2. The 1 - dimethylamino - 3 - acetoxy - 3,3-dibenzylpropane salt of penicillin G.

HARLEY W. RHODEHAMEL, JR.

No references cited.